United States Patent [19]
Gibson et al.

[11] Patent Number: 5,640,594
[45] Date of Patent: Jun. 17, 1997

[54] METHOD AND SYSTEM FOR ASSIGNING PERIPHERAL DEVICE ADDRESSES

[75] Inventors: Glen Gibson, San Ramon; Matthew Fischer, Mt. View, both of Calif.

[73] Assignee: Advanced Micro Devices, Inc., Sunnyvale, Calif.

[21] Appl. No.: 679,650

[22] Filed: Jul. 12, 1996

Related U.S. Application Data

[63] Continuation of Ser. No. 148,146, Nov. 5, 1993, abandoned.
[51] Int. Cl.$^6$ .................................................. G06F 15/17
[52] U.S. Cl. ............................................................ 395/829
[58] Field of Search ................................. 395/821, 822, 395/823, 828, 829

[56] References Cited

U.S. PATENT DOCUMENTS

| | | | |
|---|---|---|---|
| 5,138,706 | 8/1992 | Melo et al. | 395/500 |
| 5,274,771 | 12/1993 | Hamilton et al. | 395/275 |
| 5,317,693 | 5/1994 | Cuenod et al. | 395/275 |
| 5,428,748 | 6/1995 | Davidson et al. | 395/275 |

FOREIGN PATENT DOCUMENTS 0528773  7/1992  European Pat. Off. ......... G06F 13/38

OTHER PUBLICATIONS

Intel Corporation and Microsoft Corporation; *Plug and Play ISA Specification;* ©1993, 1994 (Version 1.0a).
Macintosh ® *Family Hardware Reference;* Apple Computer, Inc., 1988, pp. 11–20 to 11–25.
3Com Corporation,"3c509 and 3c509–TP Adapters Technical Reference Guide", Manual Part No. 8369-00. Mar./1992, pp. 6–19 and pp. 7–1 to 7–2.
National Semiconductor "Local Area Networks" Databook, 1993 Edition. pp. 1–16 to 1–18.

*Primary Examiner*—David L. Robertson
*Attorney, Agent, or Firm*—Benman Collins & Sawyer

[57] ABSTRACT

A system for relocating expansion cards within a personal computer is provided that eliminates the need for manually changing the address locations. By examining both the address and the data of I/O accesses, the system provides security against accidental reprogramming of the device. Through the use of this system, both hardware implementation and the time needed to execute the reprogramming operation is minimized.

16 Claims, 8 Drawing Sheets

METHOD AND SYSTEM FOR ASSIGNING PERIPHERAL DEVICE ADDRESSES

This application is a continuation of application Ser. No. 08/148,146 filed on Nov. 5, 1993, abandoned.

FIELD OF THE INVENTION

The present invention relates to the direct memory access (DMA) of a card placed in the expansion slot of a personal computer and more particularly to an improved system for selecting a particular DMA channel for a card.

BACKGROUND OF THE INVENTION

Most desktop personal computer (PC) systems contain "expansion bus" slots. These slots are physical connectors that allow printed circuit board (PCB) cards containing additional resources to be connected to the PC. Examples of typical expansion card functions are: disk drive controller, video graphics controller, serial port controller, parallel port controller and network controller. Each expansion card that is inserted into the system is connected to the PC's main resources (such as memory and the central processing unit (CPU)) through the expansion bus. Since the expansion bus is shared by all cards in the system, any card that wishes to utilize the PC's main resources must first indicate its intentions by asserting a "DMA request" signal. Alternatively, whenever the PC's CPU wishes to access resources on board an expansion bus card, it must uniquely indicate this to insure that only one card responds. This is done through unique "I/O and memory addressing." Any expansion card may request attention from the CPU by asserting an "interrupt" signal.

When several expansion cards have been installed in a system, then there should not be conflicts between cards with respect to the DMA request, the I/O and memory addresses, and the interrupt signalling. If conflicts do arise, the system will fail. To avoid this problem, the system provides multiple DMA request lines, or channels, and each card that wishes to utilize the DMA resources must be connected to a separate DMA request channel to avoid conflicts. The system also provides multiple interrupt channels, and again, each card that wishes to utilize an interrupt must be connected to a separate interrupt channel. For I/O and memory addressing, expansion cards typically contain a fixed set of possible addresses, and the address for each card must be set to a value that does not conflict with the address of any other resource in the system.

The most common method for selecting a particular DMA channel for a card (or for selecting interrupt channels and addresses) is to build "jumpers" onto each expansion card. The jumpers are manually moved in order to vary the selected DMA request and interrupt channel selection and also to select different I/O and memory addresses for the card to respond to. Physically, each card is connected to multiple channels at the expansion bus connection point; these signals are all connected to one side of a multiplexer that is controlled by the jumper settings. By modifying the jumper settings, different DMA channels and interrupt channels can be selected. In the case of I/O and memory addressing, the jumpers are used to modify the decoder that determines when an address that is present on the expansion bus corresponds to the card's address. Modifying the I/O and memory address jumpers modifies the address to which the card responds.

While using jumpers to create flexibility for each card allows multiple cards to be inserted into a system without conflict, the procedure that must be followed when inserting new cards is such that the system must be powered off in order to readjust the jumper settings on the existing cards to make room for the new card. Then the system is powered up again and for those cards that have modified jumper settings, individual "card resource files" must be updated so that the driver software for each card is informed of the changes.

There have been other attempts to solve this problem. However these solutions do not provide an adequate degree of protection for many applications or are very complex to implement. Hence, there is a long-felt but unsatisfied need to have a system for providing a reliable system for relocating expansion cards without having to physically make adjustments to the card or the computer in which the card is located. The present invention addresses such a need.

SUMMARY OF THE INVENTION

A system is provided that allows for relocating the address locations of an expansion card in a personal computer by using a peripheral controller. In one aspect, a method for assigning a first plurality (m) of addresses to a peripheral devices coupled to a computer system is disclosed. The computer system has a second plurality of addresses. The method comprises the steps of: (a) providing a command from a central processing unit within the computer system to make an access to a specific address; (b) determining if access to the specific address has been made; (c) determining if a first specific data is located in the specific address if access has been made to the specific address; (d) repeating sequence of step (a) to (c) for a predetermined number (n) of times, each time determining if an nth specific data is located in the specific address if the first specific data and the subsequent specific data are located in the specific address; and (e) assigning a first address to the peripheral device according to the nth specific data located in the specific address determined during the nth sequence of step (a) to (d).

In another aspect, a peripheral controller for assigning a first plurality (m) of addresses to a peripheral device coupled to a computer system is disclosed. The computer system having a second plurality of addresses within a register. The peripheral controller comprises a data buffer responsive to the computer system for directing the computer to provide a command for making an access to a specific address in the register; means for determining if access to the specific address has been made and for determining if a first specific data is located in the specific address if access has been made to the specific address, and repeating the access for a predetermined number (n) of time, each time determining if an nth specific data is located in the specific address if the first specific data and the subsequent specific data are located in the specific address. The controller also including register means for assigning a first address to the peripheral device according to the nth specific data located in the specific address, and assigning the rest of the first plurality (m) of addresses to the peripheral device according to the nth specific data located in the specific address determined during each of the successive nth determination that a specific data is located in the specific address.

Through this system, additional security is provided against accidental programming by examining both data and address information. This system adds minimal additional hardware and does not appreciably affect time of execution of the reprogramming operation.

DETAILED DESCRIPTION

The present invention relates to an improvement in locating cards in expansion bus slots in a personal computer. The following description is presented to enable one of ordinary skill in the art to make and use the invention as provided in the context of a particular application and its requirements. Various modifications to the preferred embodiment will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1:
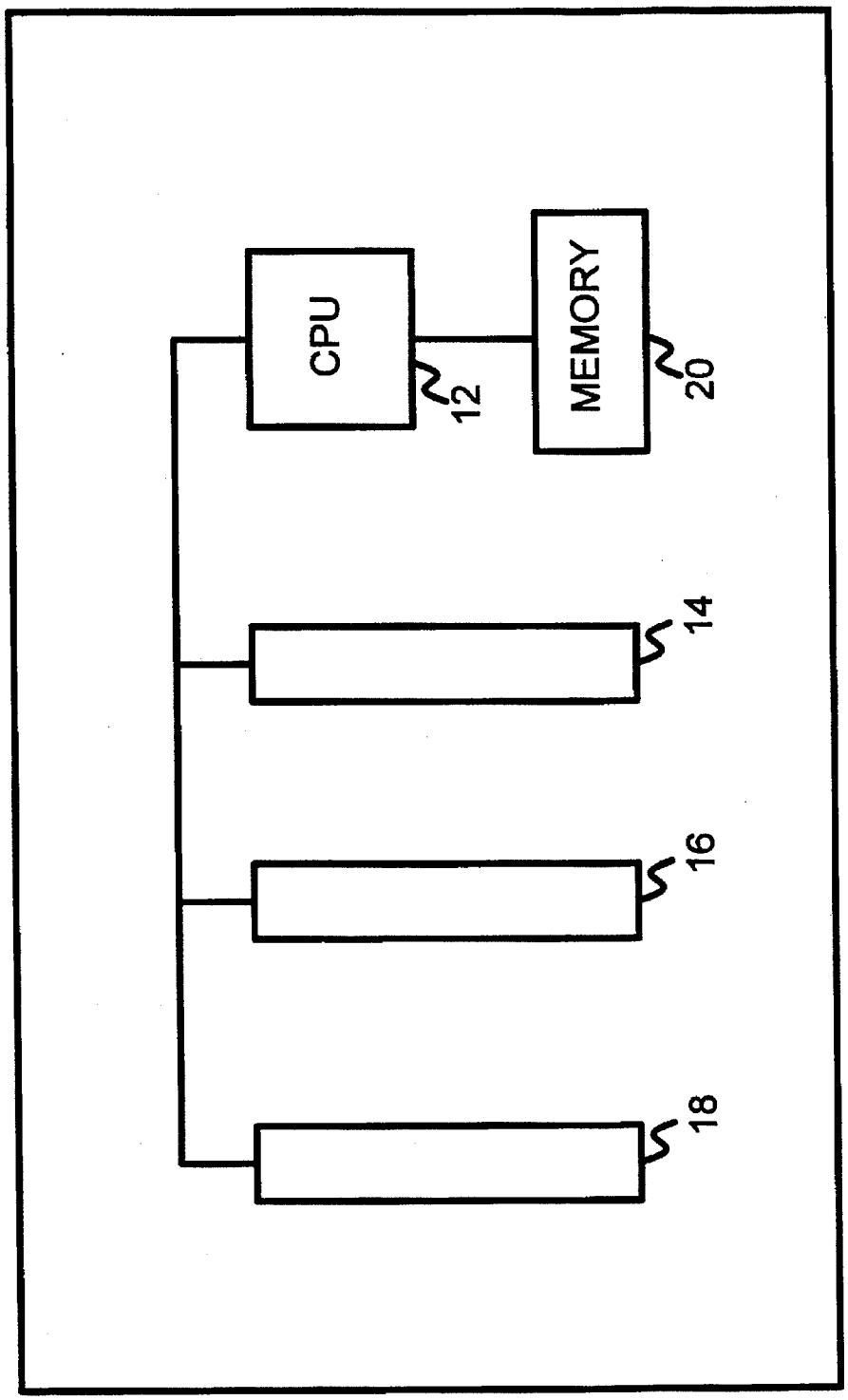
FIG. 1 is a simple block diagram of a personal computer system.

Referring now to FIG. 1 which is a simple block diagram of a personal computer (PC) 10. It should be understood by one of ordinary skill in the art that there are other components required for the operation of a PC but only those portions relevant to the present invention are described herein. The personal computer 10 includes a central processing unit 12 which sends I/O signals to the different DMA cards 14, 16, and 18. The CPU 12 also typically accesses memory 20.

The Software Relocatable Mode (SRM) system of the present invention removes the problems of (1) turning off system power, (2) manually adjusting the jumpers on an expansion card, (3) manually modifying the card resource file, (4) reduces cost of board by eliminating jumper components.

Figure 2:
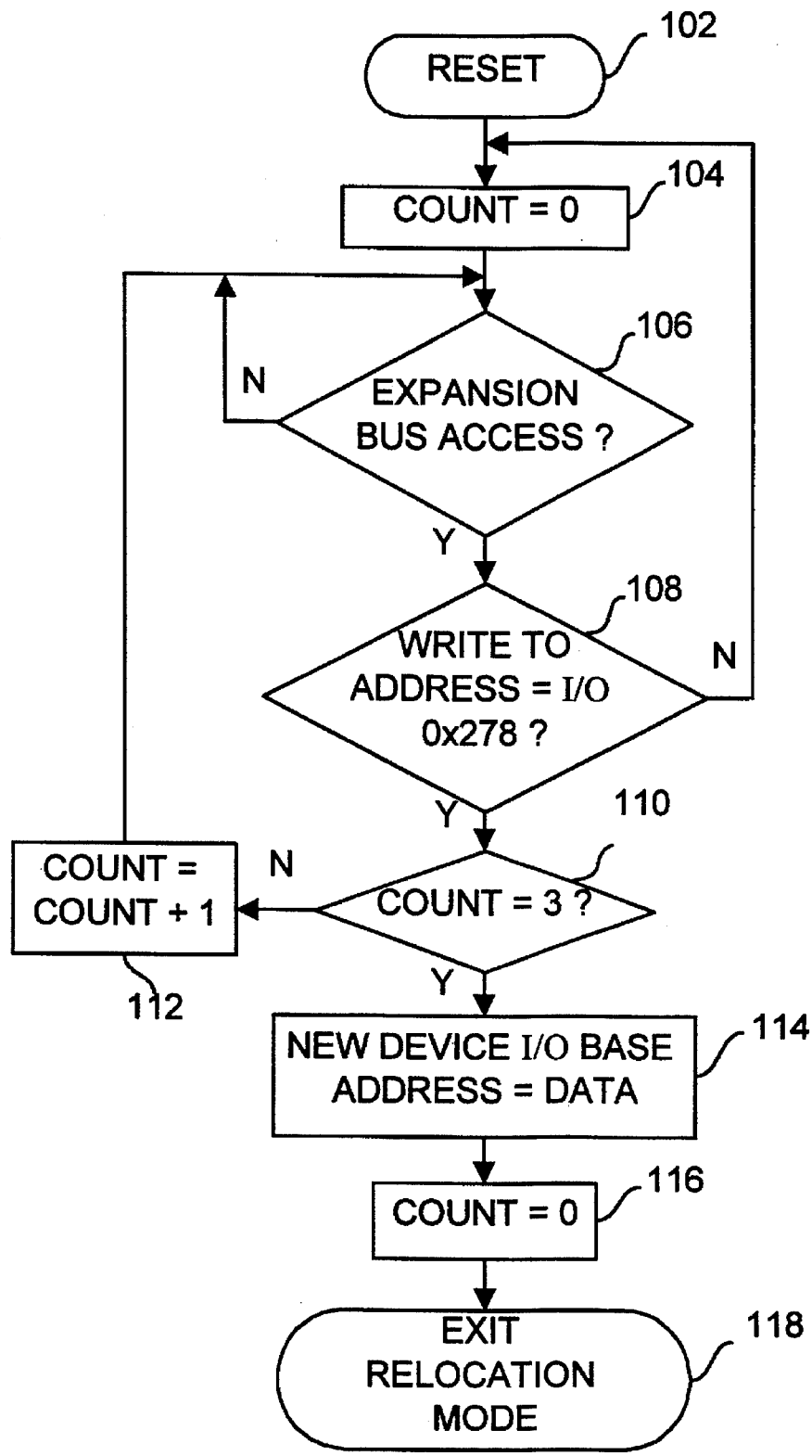
FIG. 2 is a first flow chart of a prior art system for relocating an expansion card.

There have been other systems that have been devised to address these problems. However the problems with these systems is that they are either do not ensure that the relocation data is accurate or they are very complex to implement. A first prior art system 100 for providing the relocation information is shown at FIG. 2. In this embodiment, when reset is accessed, via step 102, the count is initialized, via step 104. Thereafter, it must be determined if there is an expansion bus access, via step 106. If the answer is no then there is a return to step 106 until there is an expansion bus access.

If the answer is yes, then it must be determined if there is a write to predetermined address, via step 108. If the answer is no, then return to step 104. If the answer is yes then determine if count=3, via step 110 in this example. If the answer is no, then the count is incremented by one, via step 112. After the count is incremented, then it is returned for the next expansion bus access, via step 106. When the count equals three, the new programming information is provided via step 114. The count is then reset to zero, via step 116. Then the relocation mode is exited, via step 118.

Accordingly in this embodiment, a sequence of accesses to a specific address (I/O location 0×278) is searched for with no specific data required. When the specific sequence has been seen (i.e., 3 write accesses to 0×278), then the programming information (I/O base address) for the device is taken as the data of the current (3rd) access, This solution does not provide adequate assurance because it does not check for a specific type of data, Therefore, it is possible for a card to be located in the wrong position due to the address sequence being matched but the data in that sequence being incorrect.

Figure 3:
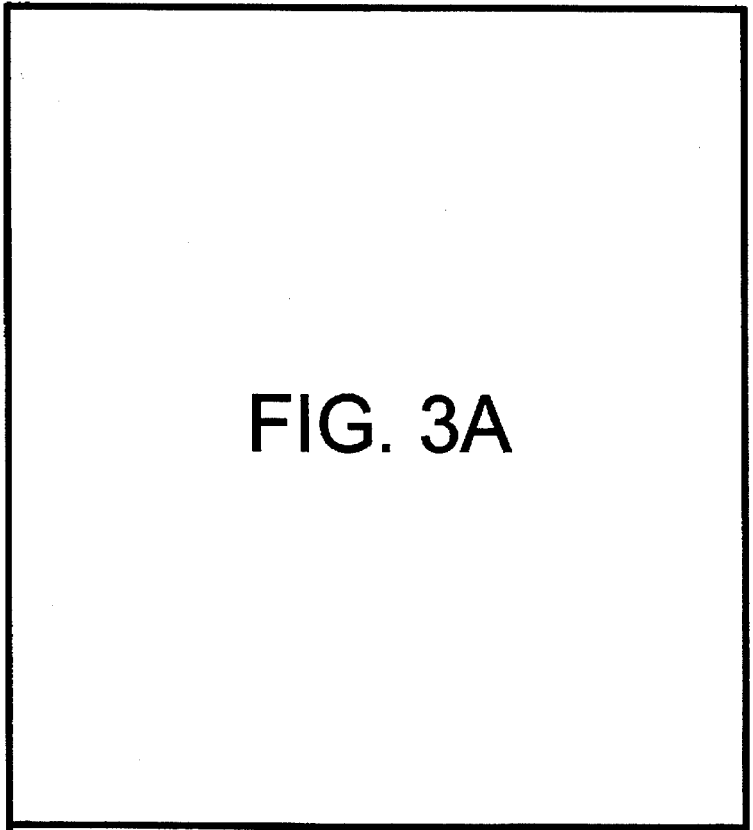
FIG. 3 is a second flow chart of a prior art system for relocating an expansion card.
Figure 3:
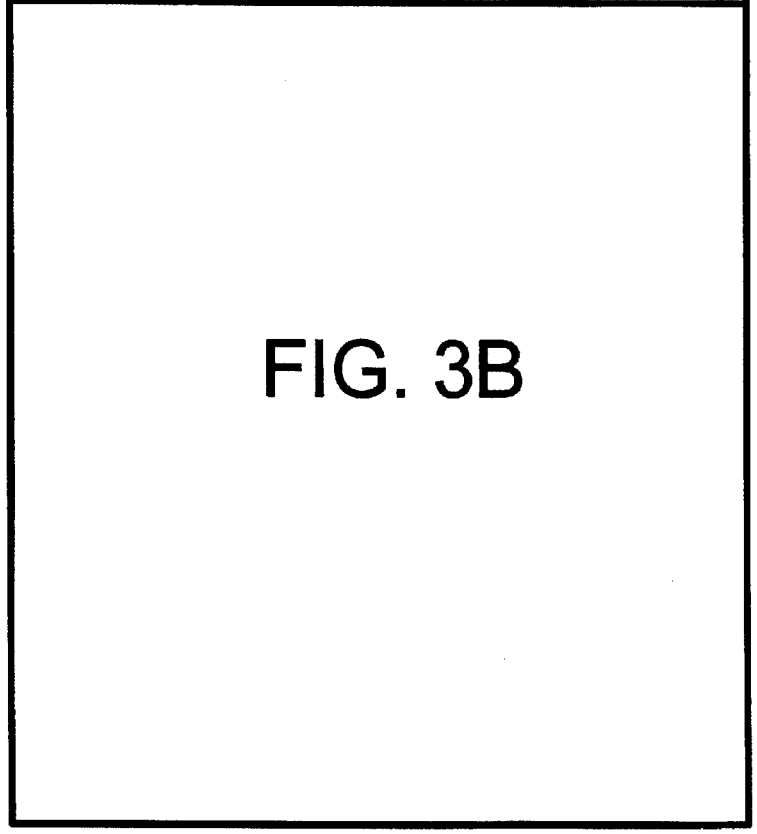
Figure 3A:
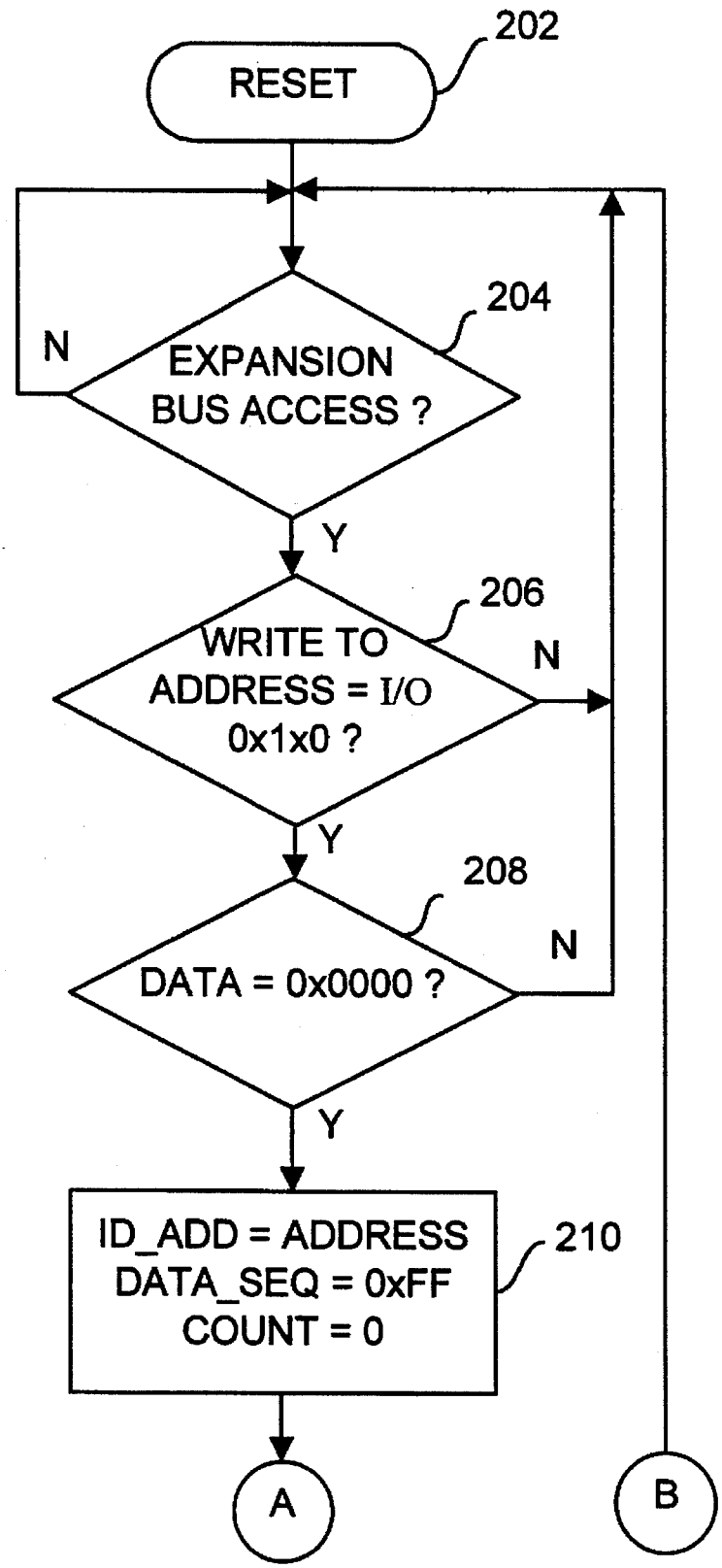
Figure 3B:
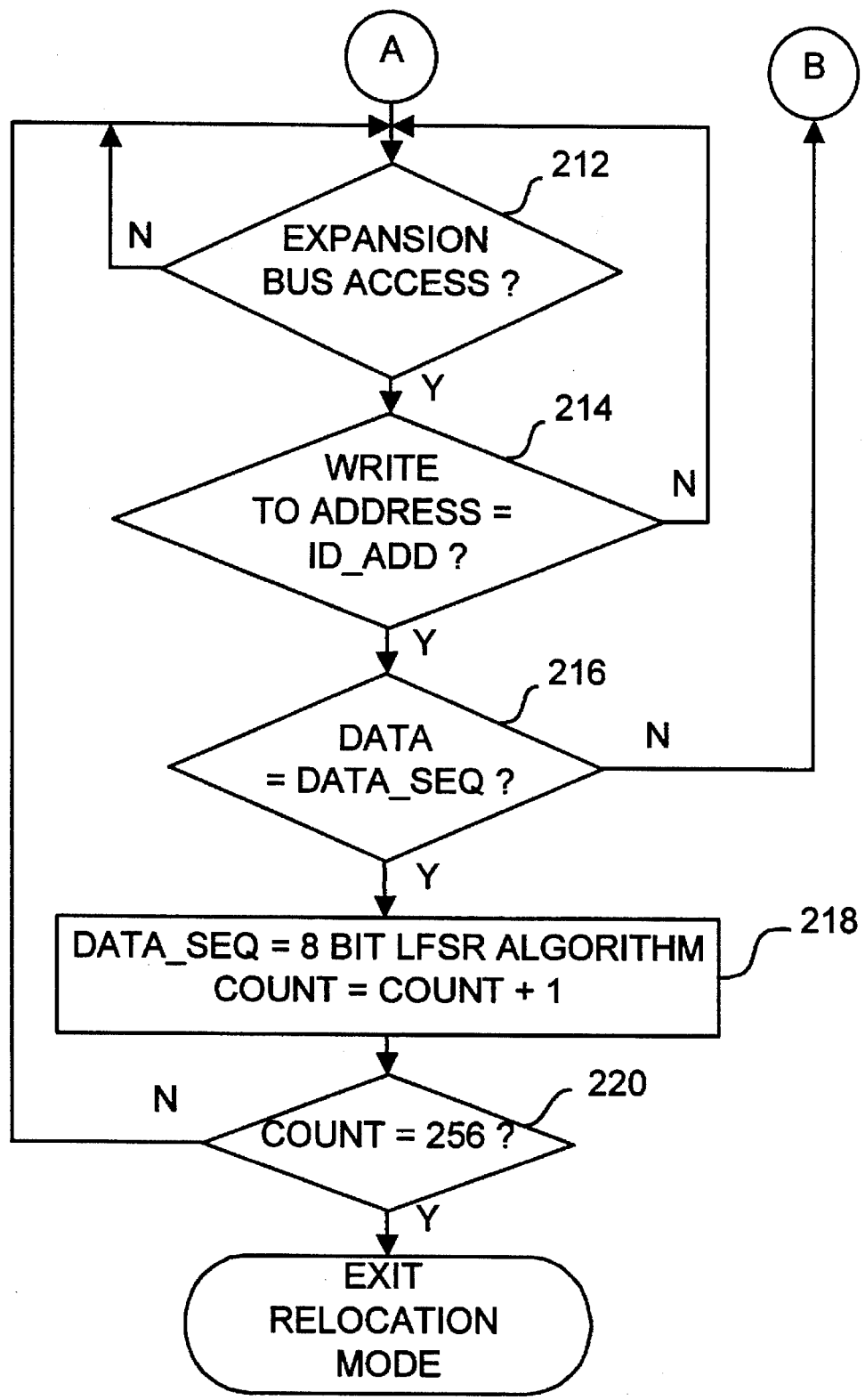

A second prior art system 200 for providing the relocation information is shown in the flow chart of FIG. 3. In this system, after a reset 202, it must be determined if there was an expansion bus accessed via step 204. If the answer is no, then return to step 204 until an expansion bus access occurs. If the answer is yes, then it must be determined if it is a write to a particular address, via step 206. If the answer is no, then return to step 204. If the answer is yes then determine if data equals a certain pattern via step 208. If the answer is no, return to step 204. If the answer is yes, then count=0 and the data must be in a certain sequence, via step 210.

Next it is determined whether there is an expansion bus access via step 212. If the answer is no, then return to step 212 until there is an expansion bus access. If the answer is yes, then it must be determined if a write is to a specified address, via step 214. If the answer is no, return to step 212. If the answer is yes, then it must be determined if the data is in the proper sequence via step 216. If the answer is no then return to step 212. If the answer is yes then the data sequence is equal to a bit sequence and the count is begun via step 218. This is repeated two hundred-fifty times via step 220 until the relocation mode is exited.

This solution is much more sophisticated, in that the accesses must contain a specific sequence of data. The sequence of data is generated in hardware with an LFSR (Linear Feedback Shift Register). The address is specific only to a RANGE of addresses to begin with. That is, at first, it is acceptable to use any address in the I/O range of 0×100 through 0×1 F0. This means that any one of 16 addresses may be used. An access to any of these 16 addresses with a DATA value of ZERO (0×0000) will cause that address to become the I/O address for the sequence of accesses that contains the LFSR data sequence. The implementation of such a system is relatively complex and also requires a considerable amount of memory access time.

The software relocatable mode (SRM) system of the present invention allows for more certainty that an expansion card containing a peripheral device such as a peripheral controller or the like is being relocated in a proper position than the system shown in FIG. 1 while at the same time not having the complexity of the system shown in FIG. 2. The SRM system functions in the following manner:

(1) The expansion card that uses SRM will be directly connected to several resources at the same time, i.e., the expansion card will have connections to multiple interrupt channels through individual high-impedance/driving buffers.

(2) At system power up, the SRM card will place all connections to all resources into the high-impedance state. In other words, no interrupt channel is selected and no DMA channel is selected. In addition, the card will not respond to any I/O or memory address. The card is in Software Relocatable Mode. The SRM card will not interfere with the operation of any other card or resource in the system. There can be no conflict with other cards while the card is in Software Relocatable Mode.

(3) A reconfiguration program (software) will be executed by the user in order to exit SRM. The reconfiguration program will write a specific sequence of DATA to a specific I/O address. Following this sequence, the device will accept the next sequence of data to the same address as containing programming information.

(4) The programming information will instruct the card to use a particular interrupt channel and a particular DMA channel and will deliver an I/O or memory address to the device. The device will then become responsive to I/O or memory accesses that are directed to this address. The selected DMA channel will become active. The selected interrupt channel will also become active.

(5) The reconfiguration program writes the programmed information to the resource file for the SRM card, so that driver software for the card will be able to locate and use the card.

Figure 4:
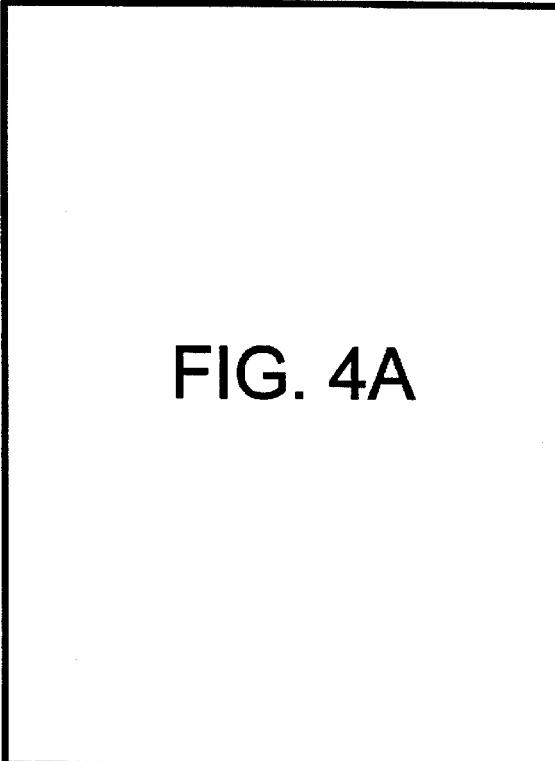
FIG. 4 is a flow chart of a system relocating an expansion card in accordance with the present invention.
Figure 4:
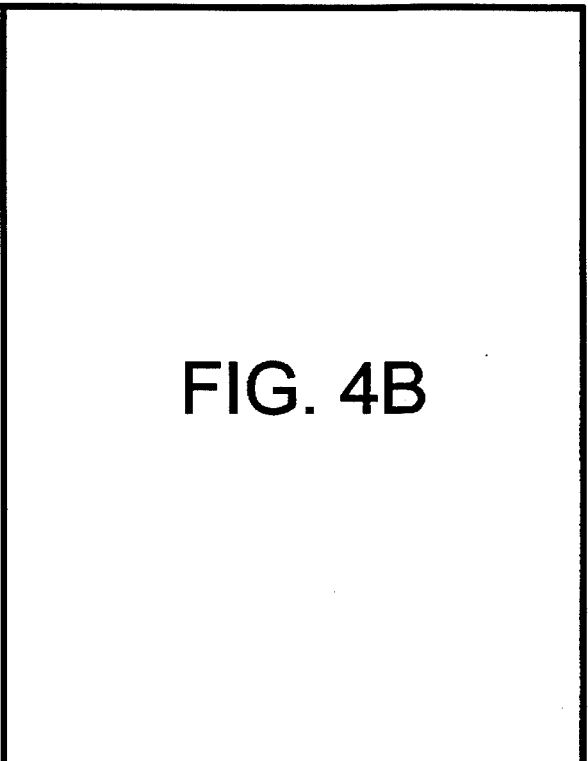
Figure 4A:
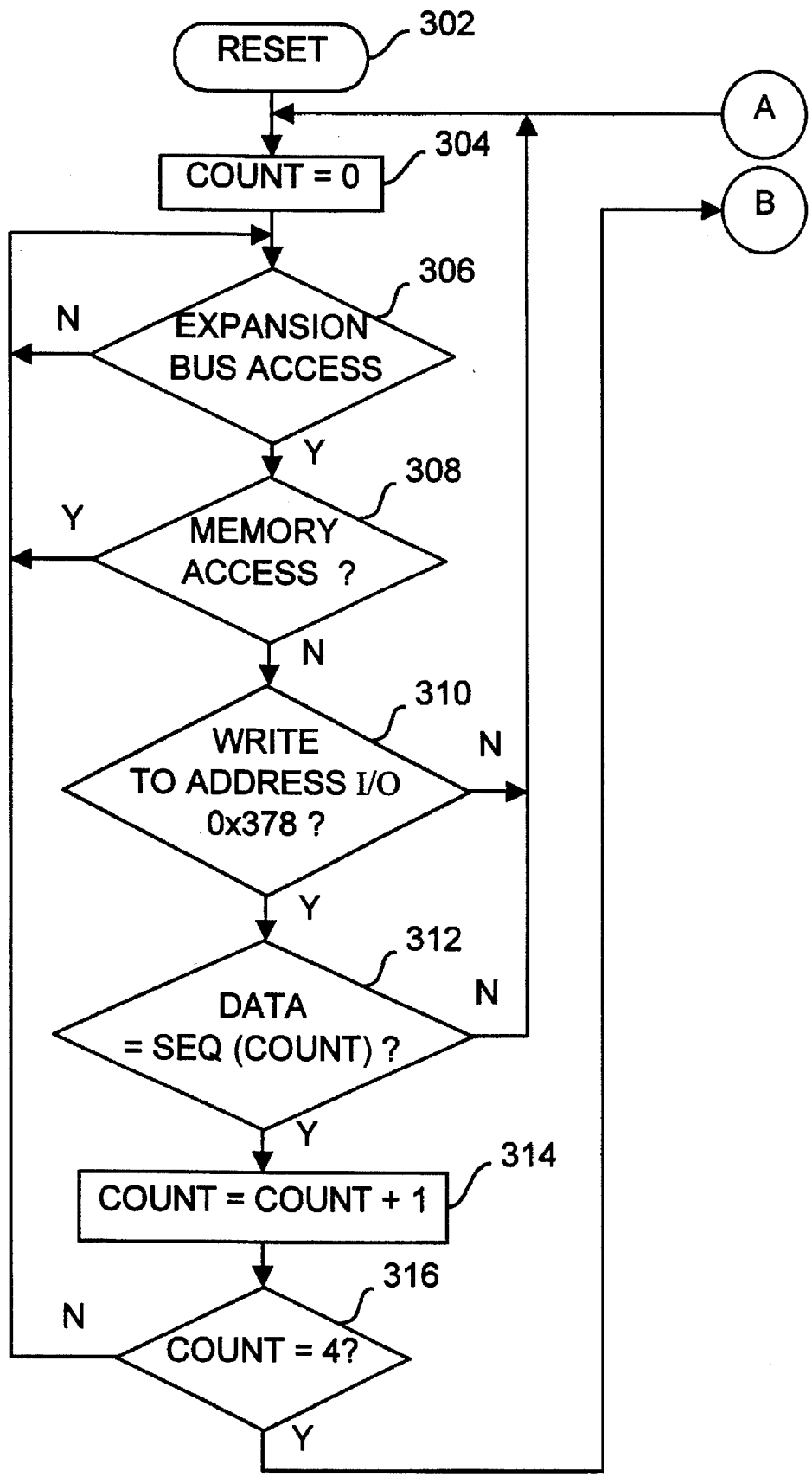
Figure 4B:
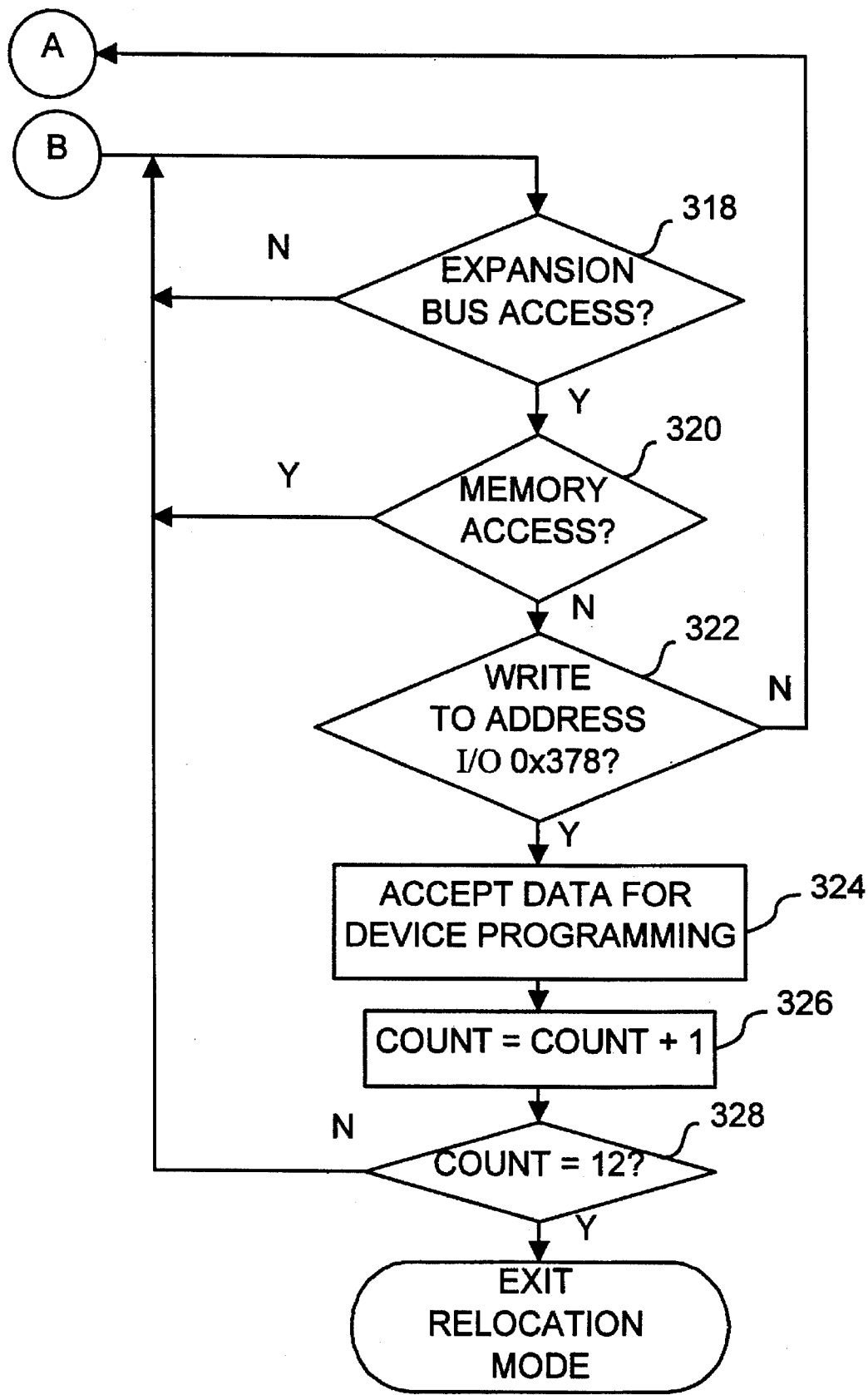

To more specifically describe the advantages of the present invention refer now to FIG. 4 which is a flow chart of the software relocatable mode of the present invention. In this embodiment, when reset is accessed, via step 302, the count is initialized, via step 304. Thereafter, it must be determined if there is an expansion bus access, via step 306. If the answer is no then there is a return to step 306 until there is an expansion bus access. If the answer is yes, then it must be determined whether this access is a memory access via step 308, if the answer is yes, then return to step 306 because for an expansion card relocation only I/O accesses are utilized. If the answer is no then it is an I/O access.

If the answer is no, then it must be determined if there is a write to predetermined address, via step 310. If the answer is no, then return to step 304. If the answer is yes, then it must be determined whether the sequenced data is accurate via step 312. If the data is not accurate then return to step 304. If the data is accurate then the count is incremented by 1 via step 314. Then it must be determined if the count equals some predetermined number in this case, count=4, via step 316. If the answer is no, then all of the above identified steps, except step 304, are repeated. When the count equals the predetermined number steps 306–310 are repeated as steps 318–322. The data is then accepted for device programming via step 324. Thereafter a counter is incremented via step 326. Then it must be determined if the count equals some predetermined number in this case, count=12, via step 328. If the answer is no, then the steps 318–328 are repeated. Once the predetermined count is reached then the relocation mode is exited.

Advantages of the SRM system:

By examining both address and data of I/O accesses, the present invention provides additional security against accidental reprogramming of the device.

By keeping the sequence short, the present invention minimizes both the hardware implementation and the time needed to execute the reprogramming operation.

The SRM software is separate from the driver software that is used by the device during normal operations. By updating the card resource file, the present invention avoids an additional step that would be needed in the other methods. This is the step that allows for communication between the SRM software and the driver software—by having the SRM software write the programmed I/O address and Interrupt channel into the card resource file, the driver software is able to discover this information without querying the user. This allows for one, instead of two, data entry step on the part of the user.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for assigning a first plurality (m) of addresses to a peripheral device coupled to a computer system, the computer system having a second plurality of addresses, the method comprising the steps of:

(a) providing a command from the computer to make an access to a location corresponding to a specific address;

(b) determining if access to the location has been made;

(c) determining if a first predetermined set of data specific to the location is at the location if access has been made to the location;

(d) repeating sequence of step (a) to (c) for a predetermined number (n) of times, each time determining if a predetermined set of data specific to the location is at the location if the first predetermined set of data is at the location; and (e) assigning a first address to the peripheral device according to the nth predetermined set of data at the location determined during the nth sequence of step (a) to (d).

2. The method as recited in claim 1 in which if access has not been made to the location, the method further comprises the step of:

(c1) repeating steps (a) to (b).

3. The method as recited in claim 2 in which if the first predetermined set of data is not at the location, the method further comprises the step of:

(d1) repeating step (a), (b), (c), and (d).

4. The method as recited in claim 3 in which if during one of the sequence of step (d), the location has not been accessed or the predetermined set of data for that sequence is not at the location, the method further comprises the step of:

(d2) repeating steps (a), (b), (c), and (d).

5. The method as recited in claim 1 which comprises an additional step (f) repeating steps (a) to (e) for assigning the rest of the first plurality (m) of addresses to the peripheral device according to the nth predetermined set of data at the location determined during each of the successive nth sequence of steps (a) to (d).

6. The method as recited in claim 1, wherein n in step (d) equals to four.

7. A method for assigning a first plurality (m) of addresses to a peripheral device coupled to a computer system, the computer system having a second plurality of addresses, the method comprising the steps of:

(a) providing a command from the computer to make an access to a location corresponding to a specific address;

(b) determining if access to the location has been made;

(c) determining if a first predetermined set of data specific to the location is at the location if access has been made to the location;

(c1) repeating stapes (a) to (b);

(d) repeating the sequence of steps (a) to (c) for a predetermined number of times, each time determining if a predetermined set of data specific to the location is at the location if the first predetermined set of data is at the location;

(d1) repeating steps (a), (b), (c), and (d) if the first predetermined set of data is not at the location;

(d2) repeating steps (a), (b), (c), and (d) if during one of the sequence of step (d) the location has not been accessed or the predetermined set of data for that sequence is not at the location;

(e) assigning a first address to the peripheral device according to the nth predetermined set of data a the location determined during the nth sequence of step (a) to (d); and (f) repeating steps (a) to (e) for assigning the rest of the first plurality (m) of addressees to the peripheral device according to the nth predetermined set of data at the location determined during each of the successive nth sequence of steps (a) to (d).

8. The method as recited in claim 7, wherein n in step (d) equals to four.

9. A computer-readable medium containing program instructions for assigning a first plurality (m) of addresses to a peripheral device coupled to a computer system, the computer system having a second plurality of addresses, the program instructions comprising the steps of:

(a) providing a command from the computer to make an access to a location corresponding to a specific address:

(b) determining if access to the location has been made;

(c) determining if a first predetermined set of data specific to the location is at the location if access has been made to the location;

(d) repeating sequence of steps (a) to (c) for a predetermined number (n) of times, each time determining if a predetermined set of data specific to the location is at the location if the first predetermined set of data is at the location; and (e) assigning a first address to the peripheral device according to the nth predetermined set of data at the location determined during the nth sequence of steps (a) to (d).

10. The computer-readable medium as recited in claim 9 in which if access has not been made to the location, the program instructions further comprises the step of:

(c1) repeating steps (a) to (b).

11. The computer-readable medium as recited in claim 10 in which if the first predetermined set of data is not at the location, the method further comprises the step of:

(d1) repeating steps (a), (b), (c) and (d).

12. The computer-readable medium as recited in claim 11 in which if during one of the sequences of step (d), the location has not been accessed or the predetermined set of data for that sequence is not at the location, the program instructions further comprises the step of:

(d2) repeating steps (a), (b), (c) and (d).

13. The computer-readable medium as recited in claim 9 which comprises an additional step (f) repeating steps (a) to (e) for assigning the rest of the first plurality (m) of addresses to the peripheral device according to the nth predetermined set of data at the location determined during each of the successive nth sequence of steps (a) to (d).

14. The computer-readable medium as recited in claim 9, wherein n in step (d) equals to four.

15. A computer-readable medium containing program instructions for assigning a first plurality (m) of addresses to a peripheral device coupled to a computer system, the computer system having a second plurality of addresses, the program instructions comprising the steps of:

(a) providing a command from the computer to make an access to a location corresponding to a specific address;

(b) determining if access to the location has been made;

(c) determining if a first predetermined set of data specific to the location is at the location if access has been made to the location;

(c1) repeating steps (a) to (b);

(d) repeating the sequence of steps (a) to (e) for a predetermined number of times, each time determining if a predetermined set of data specific to the location is at the location if the first predetermined set of data is at the location;

(d1) repeating steps (a), (b), (c), and (d) if the first predetermined set of data is not at the location;

(d2) repeating steps (a), (b), (c), and (d) if during one of the sequence of step (d) the location has not been accessed or the predetermined set of data for that sequence is not at the location;

(e) assigning a first address to the peripheral device according to the nth predetermined set of data a the location determined during the nth sequence of steps (a) to (d); and (f) repeating steps (a) to (e) for assigning the rest of the first plurality (m) of addressees to the peripheral device according to the nth predetermined set of data at the location determined during each of the successive nth sequence of steps (a) to (d).

16. A computer-readable medium as recited in claim 15, wherein n in step (d) equals to four.

* * * * *